United States Patent [19]

Gratton

[11] Patent Number: 4,937,988
[45] Date of Patent: Jul. 3, 1990

[54] PIGEON BARRIER

[75] Inventor: Edouard A. Gratton, Weston, Canada

[73] Assignees: William H. Young; Vaughn W. Boyt, both of Mactier, Canada

[21] Appl. No.: 394,812

[22] Filed: Aug. 17, 1989

[30] Foreign Application Priority Data

Mar. 8, 1989 [CA] Canada .................................. 593,116

[51] Int. Cl.⁵ .............................................. A01K 3/00
[52] U.S. Cl. ....................................... 52/101; 256/11; 47/46
[58] Field of Search ................. 52/101, 633, 647, 660, 52/663, 664; 256/11, 1; 47/46; 119/903, 74

[56] References Cited

U.S. PATENT DOCUMENTS

| | | | |
|---|---|---|---|
| 2,618,285 | 11/1952 | Heisig | 135/90 |
| 3,148,417 | 9/1964 | Bellas | 52/101 |
| 3,416,266 | 12/1968 | Eron | 52/101 |
| 4,100,706 | 7/1978 | White | 52/101 |

FOREIGN PATENT DOCUMENTS

| | | | |
|---|---|---|---|
| 1198524 | 8/1965 | Fed. Rep. of Germany | 256/11 |
| 497599 | 12/1938 | United Kingdom | 47/31 |

Primary Examiner—John E. Murtagh
Assistant Examiner—Linda J. Hoffert
Attorney, Agent, or Firm—Sim & McBurney

[57] ABSTRACT

A barrier for preventing pigeons from landing on a balcony rail comprising a pair of support brackets adapted for flush mounting to opposite ends of the balcony rail, and a plurality of monofilament wires secured between the pair of support brackets.

27 Claims, 3 Drawing Sheets

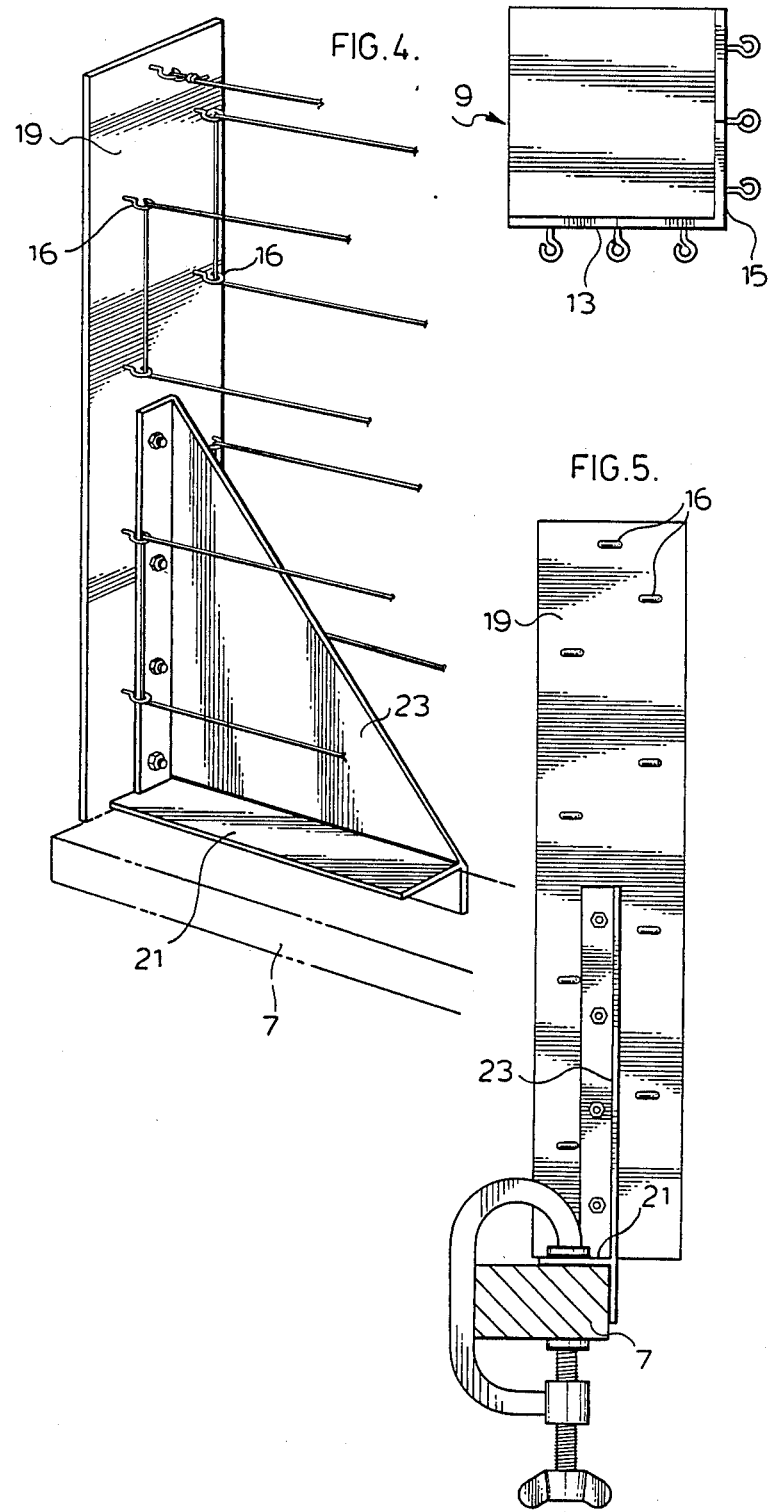

PIGEON BARRIER

This invention relates in general to bird proofing devices, and more particularly to a pigeon barrier for preventing pigeons from landing on balcony rails.

Numerous attempts have been made to prevent pigeons from roosting on balconies. One approach involves the erection of scarecrows or the installation of tin foil, bells, or other visual and auditory distractions designed to scare the pigeons from their roost.

For example, U.S. Pat. Nos, 2,938,244 (Christensen) and 3,436,882 (Keefe) each disclose antiroosting and scarecrow devices comprising corrosion resistant members for frightening or otherwise discouraging birds form roosting on ledges, balconies etc.

It has been discovered that, with time, pigeons will adapt to new surrounding such that they are no longer frightened by the scarecrows, noise makers, etc.

It has also been discovered that pigeons will not land in an enclosed space such as a balcony until they have first landed on the balcony rail in order to assess whether or not it would be safe for the bird to land on the balcony. Accordingly, a number of prior art bird proofing devices have been created for preventing the pigeons from landing on the railing, and thereby also the balcony enclosure such that the pigeons are prevented from roosting on the balcony.

One such prior art system employs the use of a single strand of wire running the length of the balcony and secured a short distance above the railing. Although this prior art system met with some initial success, it has been discovered that the pigeons eventually learn how to land on the railing to one side of the single line, thereby defeating the system.

Such a prior art single strand bird proofing device is disclosed in U.S. Pat. No. 3,416,266 (Eron), which teaches a tight wire or strand of material mounted by hooks over the edge of a roof, or around the sides of a boat, automobile etc. The prior U.S. Pat. of Eron advances an interesting theory that vibrations in the wire caused by a slight breeze, etc., apparently set up a field, or aura, in the vicinity of the wire. The Patent speculates whether this field is an intensification of the natural field about a tension strand, or whether it is a "supersonic zone" or some interrelating combination of both.

In any event, as discussed above, it has been discovered that pigeons eventually learn to land on the balcony rail by flying to one side of the single strand of wire.

U.S. Pat No. 3,148,417 (Bellas) discloses the use of a plurality of taut, substantially parallel strands supported by suitable bracket means and retained in a predetermined three dimensional spacing pattern for deterring pigeons or other birds from alighting on ledges, sills or other projections on buildings. However, there is no teaching in the system of Bellas for securing the system to a balcony railing or the like for the purpose of preventing pigeons from landing on the railing. More particularly, it is believed that in the event the Bellas system were mounted on a balcony rail, a pigeon would be capable of landing on the support bracket of Bellas which would function as a natural perch for the bird.

According to the present invention, a pigeon barrier is provided having a plurality of strands and supporting structures specifically adapted for flush mounting to the railing such that pigeons are prevented from landing on the railing, as well as the supporting structure itself. Consequently, the pigeons are prevented from roosting on the balcony.

In accordance with one aspect of the present invention, there is provided a barrier for preventing pigeons from landing on a balcony rail extending between a pair of vertical surfaces, comprising a pair of support brackets adapted for flush mounting to opposite ends the balcony rails and respective ones of the pair of vertical surfaces, and a plurality of wires extending between the pair of support brackets.

A preferred embodiment of the present invention will be described below with reference to the following drawings, in which:

FIGS. 3A and 3B are perspective and plan views respectively of the intermediate support bracket in accordance with the alternative embodiment;

FIG. 4 is a perspective view of a support bracket in accordance with the preferred embodiment; and FIG. 5 is a front elevation view of the support bracket shown in FIG. 4.

Figure 1:
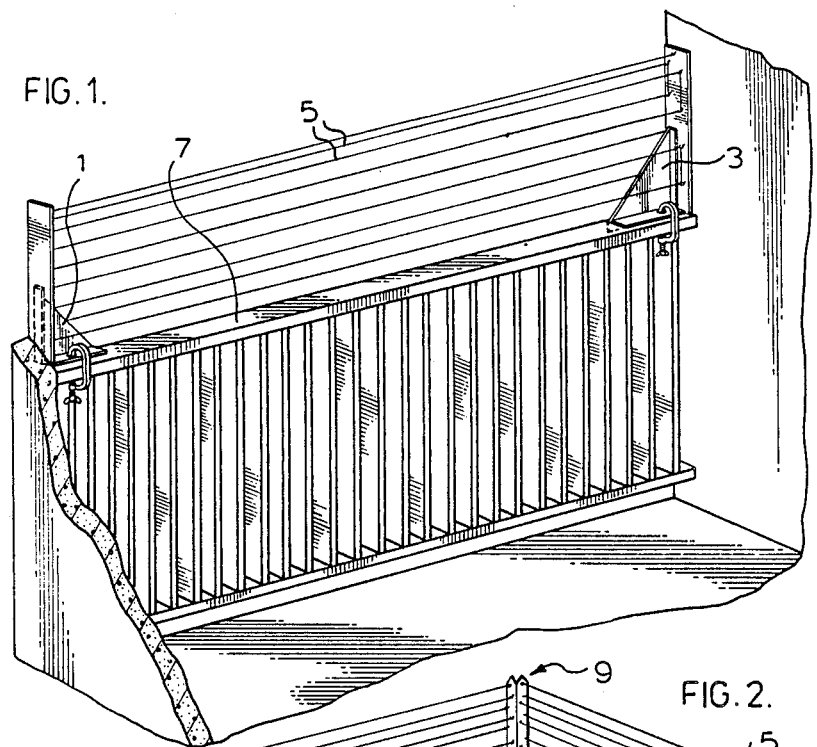
FIG. 1 is a perspective view of the pigeon barrier mounted on a balcony in accordance with the present invention.

With reference to FIG. 1, the pigeon barrier of the present invention is shown including a pair of support brackets 1 and 3 supporting a plurality of single strand wires 5 extending therebetween. Support members 1 and 3 are mirror images of each other.

The support brackets 1 and 3 are mounted on a balcony railing 7 by means of C-clamps or other suitable attachment devices.

Figure 2:
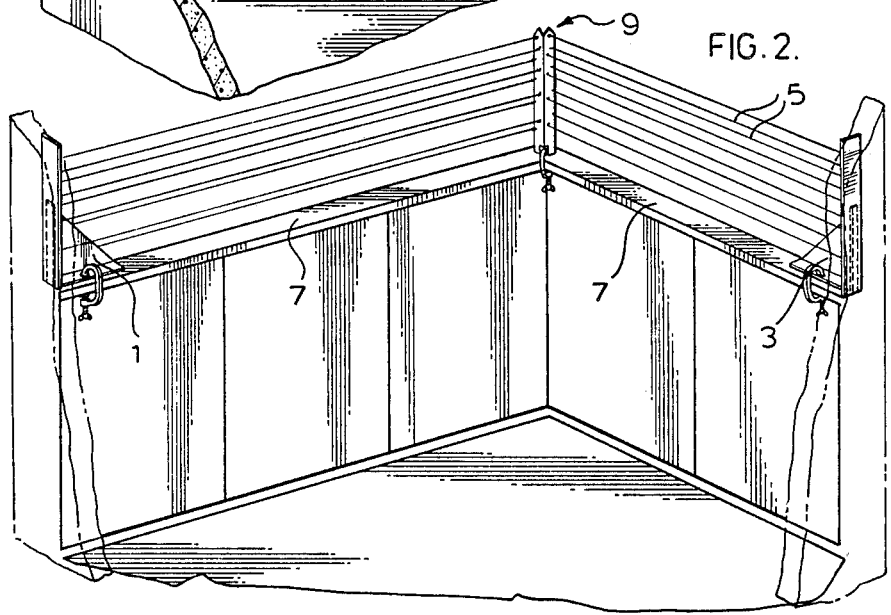
FIG. 2 is a perspective view of the pigeon barrier mounted on a cornered balcony according to an alternative embodiment of the present invention.
Figure 3A:
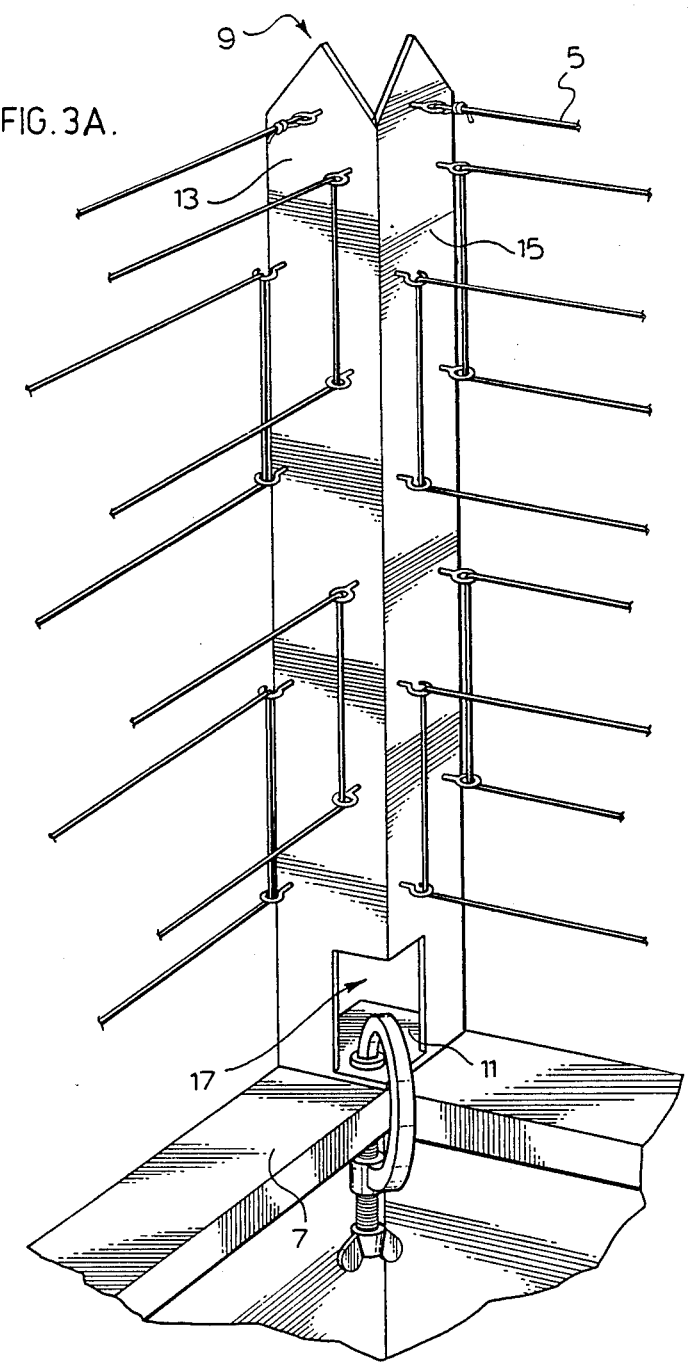

FIGS. 2, 3A and 3B illustrate an intermediate support bracket 9 adapted for flush mounting to a corner of the railing 7.

Intermediate support bracket 9 comprises a generally square horizontal planar member 11 for mounting flush with a top surface of the balcony rail 7, and a pair of substantiallY vertical planar members 13 and 15 orthogonal to horizontal member 11 and orthogonal to each other. Each of the vertical members 13 and 15 tapers to a point at the top for preventing pigeons from landing thereon.

The wires 5 are secured to vertical members 13 and 15 via corresponding hooks 16 (or eyes), or other suitable securing apparatus.

A generally square aperture or hole 17 is cut in each of the vertical members 13 and 15 adjacent the connection to horizontal member 11 such that the C-clamp or other fastening means may be attached for connecting (i.e. clamping) to the horizontal member 11 to the balcony rail 7.

Turning to FIGS. 4 and 5, the support bracket 1 is shown in greater detail comprising a generally vertical planar member 19 adapted for flush mounting to a vertical surface such as a wall, post, etc. A further plurality of hooks 16 is embedded in the vertical member 19 for securing the wires 5.

A generally horizontal planar member 21 is connected orthogonally to vertical number 19 and is adapted for flush mounting to a top surface of the balcony rail 7.

A generally triangular supporting vertical member 23 is connected to vertical member 19 and horizontal member 21 for providing additional stability. The member 23 is secured to members 19 and 21 preferably by means bolts or screws.

As seen best with reference to FIG. 5, vertical member 23 extends approximately 2 inches below horizontal member 21 for flush mounting to an outside vertical surface of the rail 7.

Flush mounting of the vertical member 19 with the wall or post in combination with flush mounting of vertical member 23 with the balcony horizontal member 21 with the balcony 7 below horizontal member 21 effectively prevents pigeons from landing on the bracket. Furthermore, the plurality of wires arranged in at least two rows serves as an additional deterrent to landing.

The important structural criteria for preventing pigeon landings on the brackets is that the vertical member 19 must be flush with the vertical surface of the wall or post and vertical member 23 must extend below horizontal member 21 and must be flush with the outer vertical surface of the rail 7.

According to a successful prototype of the invention, vertical member 19 was approximately 14 inches in height and approximately 3 to 4 inches in width; horizontal member 21 was approximately 1½ to 2 inches in width and approximately 7 inches in length along the direction of balcony rail 7; and vertical member 23 extended approximately 2 inches below horizontal member 21.

Also, according to the successful prototype the support brackets 1, 3 and 9 were fabricated from one eighth inch plastic sheet. Alternatively, one sixteenth inch steel sheet may be used.

Furthermore, in accordance with the successful prototype the strands of wire 5 were fabricated from monofilament fishing line of 8 lb. test or more, and were secured to the vertical members or support brackets 1, 3, and 9 via the hooks (or eyes) 16. However, as discussed above, the wires 5, and indeed the support brackets 1, 3, and 9 may be secured by other suitable means.

Other modifications and variations of the present invention are contemplated.

For example, whereas the support bracket 1 or 3 may be secured to the rail 7 via C-clamps for gripping horizontal member 21 and balcony rail 7, alternatively, nails, screws or bolts may be used to secure the support bracket to the wall or post and to the rail 7.

All such modifications and variations are believed to be within the sphere and scope of the present invention as defined by the claims appended hereto.

I claim:

1. A barrier for preventing pigeons from landing on a balcony rail extending between a pair of vertical surface, comprising:
   (a) a pair of support brackets adapted for flush mounting to opposite ends of said balcony rail and respective ones of said pair of vertical surfaces;
   (b) a plurality of wires extending between said pair of support brackets;
   (c) an intermediate support bracket adapted for flush mounting to a corner of said balcony rail, wherein said plurality of wires extend between a first one of said pair of support brackets and said intermediate support bracket and between said intermediate support bracket and the other one of said pair of support brackets, and
   (d) wherein said intermediate support bracket further comprises a generally square horizontal member adapted for flush mounting to a top horizontal surface of said rail at said corner, and a pair of generally vertical orthogonally oriented planar members tapering to respective points at the topmost portions thereof and being connected to said generally square horizontal member.

2. A barrier as defined in claim 1, wherein said plurality of wires are fabricated from a monofilament fishing line of at least 8 lb. test.

3. A barrier as defined in claim 1, further comprising first and second pluralities of hooks arranged in at least two vertical rows and embedded in respective ones of said pairs of generally vertical orthogonally oriented planar members for securing respective one of said plurality of wires.

4. A barrier as defined in claim 1, wherein said plurality of wires are arranged according to an offset pattern.

5. A barrier as defined in claim 1, wherein said pair of support brackets are fabricated from 8 inch plastic sheet.

6. A barrier as defined in claim 1, wherein said pair of support brackets are fabricated from 16 inch plastic sheet.

7. A barrier as defined in claim 1, wherein said pair of support brackets are mounted to said rail via C-clamps.

8. A barrier for preventing pigeons from landing on a balcony rail extending between a pair of vertical surfaces, comprising:
   (a) a pair of support brackets adapted for flush mounting to opposite ends of said balcony rail and respective ones of said pair of vertical surfaces;
   (b) a plurality of wires extending between said pair of support brackets, wherein said pair of support brackets further comprises:
   (c) a first substantially vertical planar member connected for flush mounting to a corresponding one of said vertical surfaces;
   (d) a plurality of attachment means arranged in at least two vertical rows embedded in said first substantially vertical planar member for securing respective ones of said plurality of wires;
   (e) a substantially horizontal planar member connected to a lowermost portion of said first substantially vertical planar member, said horizontal planar member being adapted for flush mounting to a top horizontal surface of said railing; and
   (f) a second substantially vertical planar member of triangular shape connected to said first vertical planar member intermediate said at least two rows of attachment means and to said substantially horizontal planar member at an edge thereof, said second substantially vertical planar member being adapted for flush mounting to an outside vertical surface of said rail, and being oriented orthogonally to said first vertical planar member and said substantially horizontal planar member.

9. A barrier as defined in claim 8, wherein said attachment means are hooks.

10. A barrier as defined in claim 8, wherein said attachment means are eyes.

11. A barrier as defined in claim 8, wherein said first substantially vertical planar member is approximately 14 inches in height by approximately 3 to 5 inches in width.

12. A barrier as defined in claim 8, wherein said substantially horizontal planar member is approximately 7 inches in length and approximately 1 to 1½ inches in width.

13. A barrier as defined in claim 8, wherein said second substantially vertical planar member is connected to said first vertical planar member and to said substantially horizontal planar member via a plurality of bolts.

14. A barrier as defined in claim 8, wherein said second substantially vertical planar member extends approximately 2 inches below said substantially horizontal member flush with said outside surface of said rail.

15. A barrier as defined in claim 8, further comprising an intermediate support bracket adapted for flush mounting to a corner of said balcony rail, wherein said plurality of wires extend between a first one of said pair of support brackets and said intermediate support bracket and between said intermediate support bracket and the other one of said pair of support brackets.

16. A barrier as defined in claim 15, wherein said plurality of wires are fabricated from monofilament fishing line of at least 8 lb test.

17. A barrier as defined in claim 15, wherein said intermediate support bracket further comprises a generally square horizontal member adapted for flush mounting to a top horizontal surface of said rail at said corner, a pair of generally vertical orthogonally oriented planar members tapering to respective points at the topmost portions thereof and being connected to said generally square horizontal member, and first and second pluralities of hooks being arranged in at least two vertical rows and embedded in respective ones of said pairs of generally vertical orthogonally oriented planar members for securing respective ones of said plurality of wires.

18. A barrier as defined in claim 8, wherein said plurality of wires are arranged according to an offset pattern.

19. A barrier as defined in claim 8, wherein said pair of support brackets are fabricated from 8 inch plastic sheet.

20. A barrier as defined in claim 8, wherein said pair of support brackets are fabricated from 16 inch plastic sheet.

21. A barrier as defined in claim 8, wherein said pair of support brackets are mounted to said rail via C-clamps.

22. A barrier for preventing pigeons from landing on a balcony rail extending between a pair of vertical surfaces, comprising:
 (a) a pair of support brackets adapted for flush mounting to opposite ends of said balcony rail and respective ones of said pair of vertical surfaces;
 (b) a plurality of wires extending between said pair of support brackets,
 (c) an intermediate support bracket adapted for flush mounting to a corner of said balcony rail, wherein said plurality of wires extend between a first one of said pair of support brackets and said intermediate support bracket and between said intermediate support bracket and the other one of said pair of support brackets, and
 (d) wherein said intermediate support bracket further comprises a generally square horizontal member adapted for flush mounting to a top horizontal surface of said rail at said corner, a pair of generally vertical orthogonally oriented planar members tapering to respective points at the topmost portions thereof and being connected to said generally square horizontal member, and first and second pluralities of hooks being arranged in at least two vertical rows and embedded in respective ones of said pairs of generally vertical orthogonally oriented planar members for securing respective ones of said plurality of wires.

23. A barrier as defined in claim 22, wherein said plurality of wires are fabricated from a monofilament fishing line of at least 8 lb test.

24. A barrier as defined in claim 22, wherein said plurality of wires are arranged according to an offset pattern.

25. A barrier as defined in claim 22, wherein said pair of support brackets are fabricated from 8 inch plastic sheet.

26. A barrier as defined in claim 22, wherein said pair of support brackets are fabricated from 16 inch plastic sheet.

27. A barrier as defined in claim 22, wherein said pair of support brackets are mounted to said rail via C-clamps.

* * * * *